(12) United States Patent
Banning

(10) Patent No.: US 8,403,617 B2
(45) Date of Patent: Mar. 26, 2013

(54) BIN HANDLING APPARATUS

(75) Inventor: Bradley Stephen Banning, Biggera Waters (AU)

(73) Assignees: Bradley Stephen Banning, Biggera Waters (AU); Inessa Banning, Biggera Waters (AU)

( * ) Notice: Subject to any disclaimer, the term of this patent is extended or adjusted under 35 U.S.C. 154(b) by 328 days.

(21) Appl. No.: 12/476,299

(22) Filed: Jun. 2, 2009

(65) Prior Publication Data

US 2010/0303592 A1 Dec. 2, 2010

(51) Int. Cl.
*B66F 9/06* (2006.01)

(52) U.S. Cl. ......... 414/632; 414/422

(58) Field of Classification Search ......... 414/607, 414/419, 420, 422, 424, 425, 469, 471, 481, 414/487, 631, 632, 641
See application file for complete search history.

(56) References Cited

U.S. PATENT DOCUMENTS

| | | | | |
|---|---|---|---|---|
| 3,270,900 A | * | 9/1966 | Sherman | 414/303 |
| 3,486,648 A | * | 12/1969 | Dewald | 414/420 |
| 3,595,414 A | * | 7/1971 | Brown et al. | 414/420 |
| 3,613,924 A | * | 10/1971 | Monson | 414/420 |
| 3,739,929 A | | 6/1973 | McRobert | |
| 3,902,616 A | * | 9/1975 | Santic et al. | 414/420 |
| 5,281,073 A | | 1/1994 | Gesuale | |
| 5,288,195 A | * | 2/1994 | McIntyre | 414/400 |
| 5,584,639 A | * | 12/1996 | Walker, Jr. | 414/476 |
| 5,593,270 A | * | 1/1997 | Richards | 414/458 |
| 5,800,117 A | * | 9/1998 | Milton | 414/540 |
| 6,702,543 B1 | * | 3/2004 | Nora et al. | 414/421 |
| 7,018,155 B1 | | 3/2006 | Heberling et al. | |
| 7,326,022 B2 | * | 2/2008 | Brown et al. | 414/483 |
| 7,547,176 B2 | * | 6/2009 | Blackwell et al. | 414/419 |
| 2005/0008461 A1 | * | 1/2005 | Herdrich | 414/24.5 |
| 2007/0065265 A1 | | 3/2007 | Benson | |

FOREIGN PATENT DOCUMENTS

| | | |
|---|---|---|
| DE | 4321538 | 1/1995 |
| JP | 02188397 | 7/1990 |
| JP | 09165198 | 6/1997 |

* cited by examiner

*Primary Examiner* — Joshua Rudawitz
(74) *Attorney, Agent, or Firm* — Saliwanchik, Lloyd & Eisenschenk

(57) ABSTRACT

In the figures there is provided a bin handling apparatus comprising a trailer (10) having a pair of spaced chassis members (14) defining a rear-opening space. A hoist assembly (16) includes spaced support beams (17) pivoted at pivots (20). The forward ends of the support beams (17) are interconnected and support a hoist tower (22) having a lift chain moving a tine carriage (24) from which is cantilevered a pair of spaced lifting tines (26). A tipping ram (27) serves to rotate the hoist assembly (16) about the pivots (20). A headstock (30) on the hoist tower (22) has apertured bin engaging lugs. An open-topped bin assembly (31) has a movable wall (35) hinged to the upper, rear edge and forming a closure which can be locked in the closed position by latches. The front wall of the bin has engagement lugs (37) with apertures adapted to align with the apertures in the bin engaging lugs, and be retained by an elongate steel pin (40).

9 Claims, 2 Drawing Sheets

BIN HANDLING APPARATUS

FIELD OF THE INVENTION

This invention relates to bin handling apparatus.

This invention has particular application to bin handling apparatus for clearing office and fit out waste from buildings requiring the use of an elevator or lift, and for illustrative purposes the invention will be described with reference to this application. However we envisage that this invention may find use in other applications such as bin handling apparatus for general domestic or commercial waste, recycling waste or the like.

BACKGROUND OF THE INVENTION

In the fit out and reconfiguration of buildings, dry builders waste such as plasterboard and other dry walling, wall studs, ceiling materials, carpet and the like is generated that must be cleared from the building. Clearance may require connecting the waste into a wheeled waste receptacle, removing the receptacle and waste from a building via (usually a service) lift or elevator, transferring the waste or the waste receptacle to a waste vehicle, transporting the waste to a disposal site and emptying the vehicle or receptacle.

The waste receptacle is usually wheeled to be compatible with the floor surfaces and for ease of handling. In view of the dimensional constraints imposed, especially by the lift or elevator, the receptacle is usually a lidded poly bin known as a "wheelie bin". The service lift often exits to a car park or other space with limited overhead clearance. Accordingly, high-lift wheelie bin hoists may not be usable to empty or hoist the bins. This may compel manual lifting or unloading. High vehicles per se may also be restricted from access.

It is thus an object of at least one preferred embodiment of the invention provide a means to move builders waste from a site, enable its transport under space restrictions to a restricted-access loading area, load into transport for disposal, and discharge at a disposal site, without requiring manual lifting. Other embodiments of the present invention may confer different particular benefits or achieve different objects.

SUMMARY OF THE INVENTION

The word "comprising" and expressions using it or its parts of speech are intended, unless context indicates otherwise, to be inclusive and in essence equivalent to "including".

In one aspect the present invention resides broadly in bin handling apparatus including:
  a wheeled chassis;
  a hoist mounted on said chassis and having a lifting member adapted lift clear of the ground a bin located over the lifting member;
  securing means adapted to selectively secure the bin to the hoist, and
  tipping means operable to tip the hoist and bin in assembly for emptying of the bin.

The wheeled chassis may be a powered vehicle or a towable vehicle or trailer. The wheeled chassis may comprise a pair of spaced chassis members defining an open-sided space therebetween. By this means the lifting member may operate in the open sided space, whereby the bin may be moved into the space trough the open side and over the lifting member. The spaced chassis members may be interconnected at their forward end and are each supported by the wheels of the vehicle intermediate their respective ends. Preferably, the wheels are mounted on trailing arm or other suspension means that do not require a beam axle to pass through the space.

The bins are preferably wheeled bins although it is envisaged that pallet-jackable bins may be used, whether wheeled or not.

The hoist may take any form consistent with supporting the lifting member and being tippable in assembly with the bin. For example, the hoist may approximate the hoist arrangement of a fork lift. In this case the lifting member may comprise a forklift tine-like member. The lifting member may include selectively operable raking means to rake back a lifted bin toward the hoist. This reduces the likelihood of the bin toppling rearward off the tine. The rake may also positively urge the bin toward engagement of the securing means. The hoist is preferably operable by way of vehicle powered hydraulics.

The hoist may be capable of accepting one or more of the bins. For example, the hoist may comprise a hoist having two or more forklift tine-like lifting members, and the space may be configured to accept two bins side-by-side and adapted to be lifted by respective tines.

The securing means may take any suitable form. For example, the securing means may comprise complementary latching components. The latching components may include the hinge pin of a top-lidded bin engaging an automatic or manual latch associated with the hoist. Alternatively the securing means may be a positive engagement such as a transverse pin adapted to capture respective indexed apertures trough engagement portions of the bin and hoist.

The lifting members and securing means may locate the bin or bins for transport. There may also be provided further support means for distance travel to remove static load off the hoist and work with the securing means to support the bins for transport. For example, the support member of tines may rest on a removable travelling beam selectively located beneath the member or tine and supported at its ends by the chassis.

The tipping means may take any particular form consistent with the opening and emptying dynamics of the bin or bins. In respect of top opening bins, the tipping means may include a simple pivot or lost motion connection with the chassis and selected to substantially invert the bin clear of the chassis. For example the tipping means may be such that the vehicle may be reversed to a pit edge for emptying by inverting the bin and hoist assembly in a rearward arc. Alternatively, the bins may be a side-opening bin. Preferably the side opening is an open side of the bin selectively closed by a side cover with is hinged to the top edge of the bin. In this case the hoist may be supported on support beams extending rearward and pivoted to the rear of the chassis, the bin being positioned with the opening side to the rear of the vehicle.

The tipping means in any case is preferably operated hydraulically.

The bins may be a conventional wheeled bin such as a wheelie bin or may be a metal open topped bin in the manner of a mini-skip. In preferred embodiments of the present invention the bins are purpose constructed bins designed to be loaded in pairs in the preferred bin handling apparatus, and be discharged through an open side of the bin selectively closed by a side cover with is hinged to the top edge of the bin. The bin may be loaded through the side opening or may also include a top opening. The top opening may be selectively closed with a hinged lid or a transit cover, or may remain open.

In a further aspect this invention resides broadly in a waste bin having a selectively openable side discharge opening, a top loading opening, and carriage means supporting the bin for movement on the ground, the carriage being selected to allow the bin to be lifted by its base on a lifting hoist, the bin and hoist having complementary engagement means for securing the bin on the hoist for transport.

BRIEF DESCRIPTION OF THE DRAWINGS

The invention will be described with reference to the following non-limiting embodiment of the invention as illustrated in the drawings and wherein.

Figure 1:
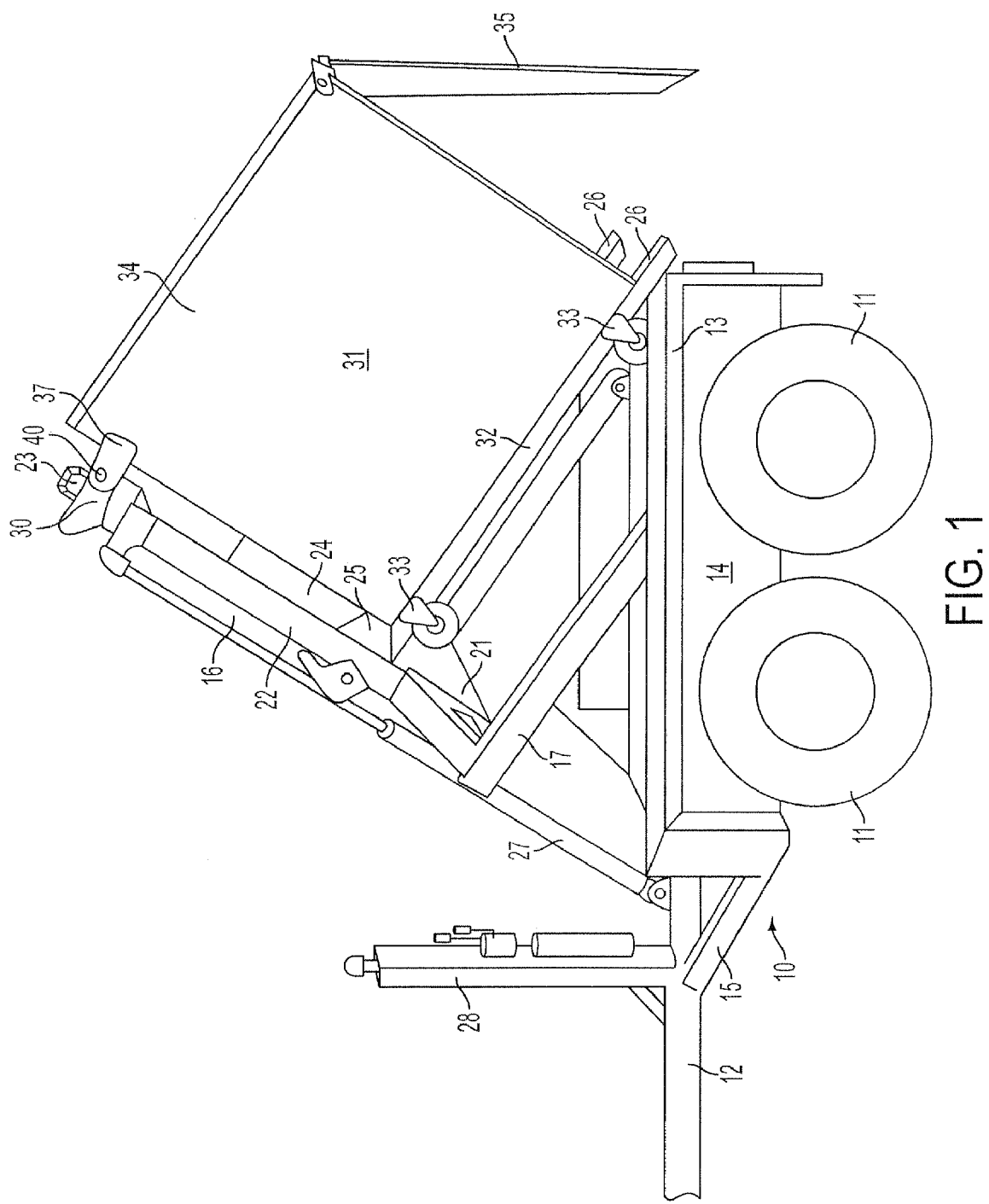
FIG. 1 is a side view of apparatus in accordance with the present invention.
Figure 2:
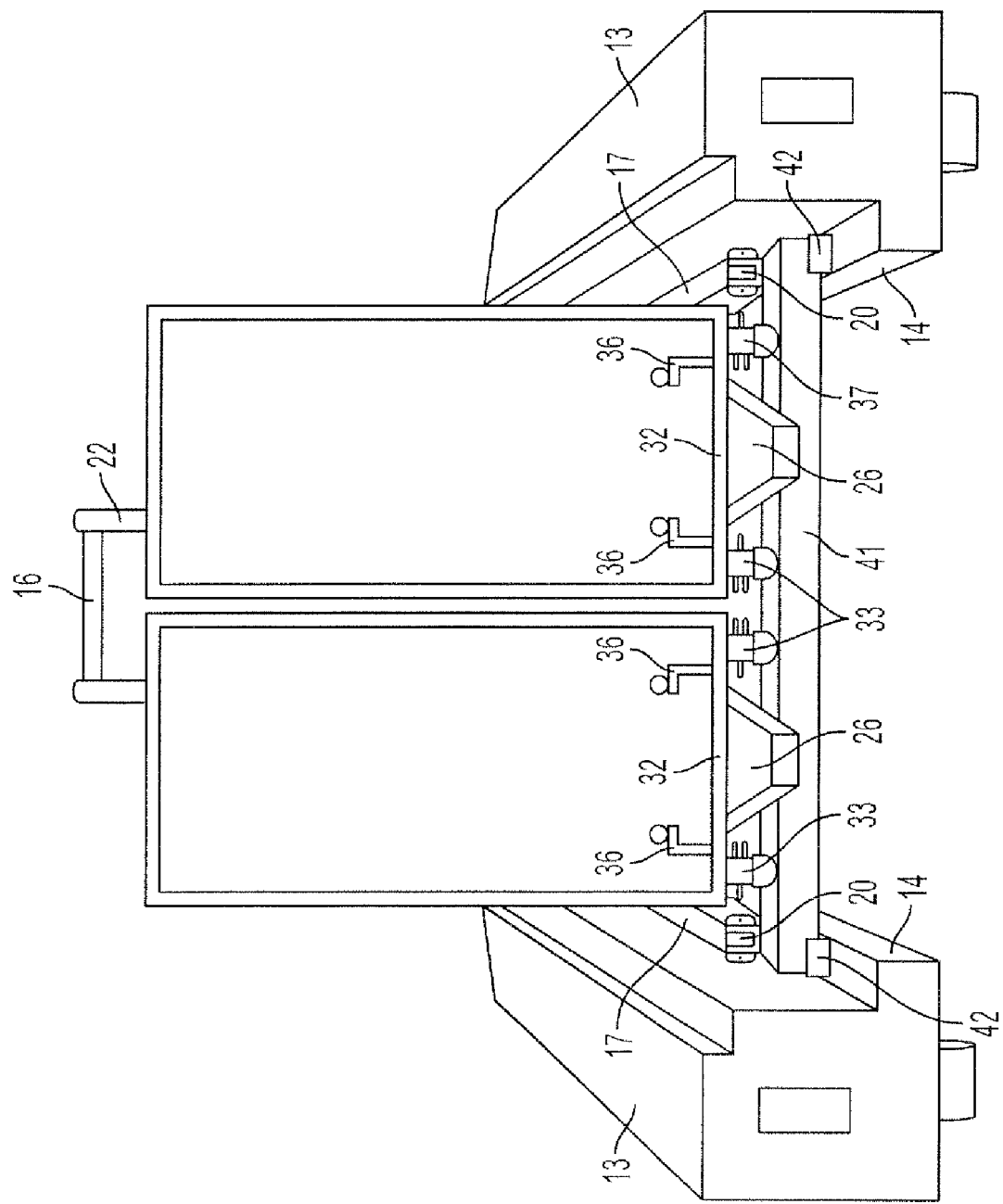
FIG. 2 is a rear view of the apparatus of FIG. 1.

In the figures there is provided a bin handling apparatus comprising a trailer (10) supported on swing arm suspended road wheels (11). The trailer (10) is adapted to be towed by a tow vehicle (not shown) via drawbar (12). Fabricated with and stiffened by the wheel arches (13) are a pair of spaced chassis members (14). The chassis members (14) are interconnected at their forward ends to the drawbar (12) by a cross member braced by braces (15). The chassis members (14) define between them a clear, rear-opening space unimpeded by axles.

A hoist assembly (16) includes a pair of spaced support beams (17) pivoted at their rear ends at pivots (20) fabricated toward the rear end of the respective chassis members (14). The forward ends of the support beams (17) are interconnected by a crossbeam (21) which supports a hoist tower (22).

The hoist tower (22) has a hydraulically operated lift chain, driven by a lower drive sprocket and idling over an upper sprocket (23). The chain moves a tine carriage (24) which mounts a tine carriage bar (25) from which are cantilevered a pair of spaced lifting tines (26). The tine carriage (24) may be lowered between the support beams (17) and Chassis members (14) until the lifting tines (26) are close to the ground.

A tipping ram (27) acts between the drawbar (12) and the upper portion of the hoist tower (22) and serves to rotate the hoist assembly (16) about the pivots (20). A control column (28) mounts hydraulic controls for the tipping ram (27).

A headstock (30) is supported on the upper portion of the hoist tower (22) and extends laterally of it. The headstock (30) has centre, left and right bin engaging lugs having coaxial pin-receiving holes transverse through them.

An open-topped bin assembly (31) has a base wall (32) supported on wheel assemblies (33). The bin assembly (31) has three fixed walls (34) and a movable wall (35) hinged to the upper, rear edge of the bin assembly (31). The movable wall forms a closure for the bin assembly (31) and can be locked in the closed position by latches (36). The front wall of the bin has at its upper portion engagement lugs (37) with apertures adapted to align with the apertures in the centre, left and right bin engaging lugs, and be retained by an elongate steel pin (40). The bin assembly is sized to fit through internal doorways and into lifts.

In use, the user lowers the tines to close to ground. The user loads the bin in the usual manner and wheels it from the worksite to the present apparatus through such doors and using such lifts as are necessary. The user rolls the bin into position over a lifting tine and lifts the bin slightly until the engagement lug apertures align with the apertures in the centre, left and right bin engaging lugs. The elongate steel pin is then inserted. The bin is lifted until the tines clear an upper plane of the chassis rails, whereupon a travelling bar (41) is inserted between chassis retainers (42) and the load on the hoist relieved for transport.

Apparatus in accordance with the foregoing embodiment has the specific advantages that the bins can pass through doorways and into lifts, can be handled readily by one person, and can be moved in pairs for capacity. The bins can be locates at multiple locations about the job. The bins, being simply dumped through the rear-opening sidewalls, mean that the user does not need to handle the waste out of the bin. There is no lifting of the bins required. The low profile, trailable apparatus is capable of operation in standard or low-ceiling underground car parks and is towable by convention light road vehicles.

It will of course be realised that while the above has been given by way of illustrative example of this invention, all such and other modifications and variations thereto as would be apparent to persons skilled in the art are deemed to fall within the broad scope and ambit of this invention as is set forth in the claims appended hereto.

I claim:

1. A bin handling apparatus comprising:
   a wheeled road vehicle chassis including a pair of spaced chassis members interconnected at their respective forward ends and are each supported by a wheel of the vehicle located intermediate the forward and rear end thereof;
   a hoist located at a forward portion of said spaced chassis members and supported on a pair of spaced support beams extending rearward of the hoist and each pivoted to a rear portion of a respective said chassis member, the two chassis members and support beam assemblies defining a space therebetween opening to the rear of the wheeled road chassis;
   two or more forklift tine-like lifting members operable by said hoist within said space;
   a pair of waste bins each having a selectively openable side wall, and a top loading opening, the pair of bins being locatable in side-by-side relation in said space over respective said lifting members for hoisting clear of the ground for transport, the bin being positioned with the openable side wall to the rear of the wheeled road vehicle chassis;
   securing means adapted to selectively secure the bins to the hoist, and
   tipping means operable to tip the hoist, support beams, lifting means and bins in assembly for emptying of the bins through their respective said selectively openable side walls.

2. The bin handling apparatus according to claim 1, wherein the wheeled chassis is selected from a powered vehicle or a towable vehicle or trailer.

3. The bin handling apparatus according to claim 1, wherein the bins are selected from wheeled bins and pallet-jackable bins.

4. The bin handling apparatus according to claim 1, wherein the hoist comprises a columnar track having a lifting chain driving a lifting member cantilevered from the track selectively up and don the column.

5. The bin handling apparatus according to claim 1, wherein the securing means comprises complementary respective latching components on the hoist and the bin.

6. The bin handling apparatus according to claim 1, wherein the securing means comprises a transverse pin adapted to capture respective indexed apertures through respective engagement portions of the bin and hoist.

7. The bin handling apparatus according to claim 1, wherein the tipping means is operated hydraulically.

8. The bin handling apparatus according to claim 1, wherein the bin is selected from a conventional wheeled bin and a metal open topped bin.

9. The bin handling apparatus according to claim 1, wherein the openable side wall is hinged to the top edge of the bin, the side openings facing the rear of the apparatus.

* * * * *